United States Patent
Lai

(10) Patent No.: US 7,923,656 B2
(45) Date of Patent: Apr. 12, 2011

(54) WIRE COLLECTING MECHANISM FOR WIRE-CUT ELECTRICAL DISCHARGE MACHINE

(75) Inventor: Chin-Hung Lai, Taichung (TW)

(73) Assignee: Max See Industry Co., Ltd., Taichung (TW)

( * ) Notice: Subject to any disclaimer, the term of this patent is extended or adjusted under 35 U.S.C. 154(b) by 559 days.

(21) Appl. No.: 11/758,268

(22) Filed: Jun. 5, 2007

(65) Prior Publication Data
US 2008/0179295 A1    Jul. 31, 2008

(30) Foreign Application Priority Data
Jan. 29, 2007  (TW) ............................. 96201717 U

(51) Int. Cl.
*B23H 7/10* (2006.01)
(52) U.S. Cl. .................................................. 219/69.12
(58) Field of Classification Search ............... 219/69.12; 83/100, 167, 950
See application file for complete search history.

(56) References Cited

U.S. PATENT DOCUMENTS

| | | | |
|---|---|---|---|
| 4,242,559 A * | 12/1980 | Roemer et al. | 219/69.12 |
| 4,367,392 A * | 1/1983 | Girardin | 219/69.12 |
| 4,929,810 A * | 5/1990 | Kawase | 219/69.12 |
| 5,288,966 A * | 2/1994 | Kawanabe et al. | 219/69.12 |
| 5,302,796 A * | 4/1994 | Kuriki | 219/69.12 |
| 5,523,538 A * | 6/1996 | Matsuda | 219/69.12 |
| 2008/0223827 A1* | 9/2008 | Chang | 219/69.12 |

FOREIGN PATENT DOCUMENTS

| | | | | |
|---|---|---|---|---|
| JP | 63-11233 A | * | 1/1988 | |
| JP | 1-321126 A | * | 12/1989 | |
| JP | 3-190626 A | * | 8/1991 | |
| JP | 10-180548 A | * | 7/1998 | |
| JP | 2005-125413 A | * | 5/2005 | |

OTHER PUBLICATIONS

Machine translation of Japan Patent No. 2005-125,413, Jul. 2010.*

* cited by examiner

*Primary Examiner* — Geoffrey S Evans
(74) *Attorney, Agent, or Firm* — Browdy and Neimark, PLLC

(57) ABSTRACT

A wire collecting mechanism for cutting and collecting a metal wire used in a wire-cut electrical discharge machine includes a first guide roller and a second guide roller movable relative to the first guide roller for clamping the metal wire that passes between the first guide roller and the second guide roller. A wire cutter is moveable relative to the metal wire for cutting the metal wire that is clamped. A wire collecting box is provided with a mouth facing the metal wire and a suction force towards an inside of the wire collecting box. A press roller is movable relative to the metal wire for pressing and forcing a cutting piece of the metal wire into the mouth of the wire collecting box, such that the cutting piece of the metal wire can be sucked into the wire collecting box.

5 Claims, 3 Drawing Sheets

WIRE COLLECTING MECHANISM FOR WIRE-CUT ELECTRICAL DISCHARGE MACHINE

BACKGROUND OF THE INVENTION

1. Field of the Invention

The present invention relates generally to a wire-cut electrical discharge machine (hereinafter referred to as "WEDM"), and more specifically to a wire collecting mechanism for cutting and collecting a metal wire used in a wire-cut electrical discharge machine.

2. Description of the Related Art

A wire cut electrical discharge machine (WEDM) is a kind of electrical discharge machine for cutting metal materials by a series of rapidly recurring electric arcing discharges between a metal wire (the cutting tool) and the workpiece, in the presence of an energetic electric field. Because the metal wire (the cutting tool) has a small diameter, it may break easily when it is improperly stretched. Therefore, a WEDM is generally equipped with a wire collecting mechanism to cut and collect the broken piece of metal wire, leaving the tip of the metal wire in a sharp condition for insertion through the workpiece again. The wire collecting mechanism of a conventional WEDM uses a mechanical arm to pick up the broken piece of metal wire and to carry the broken piece of metal wire to a wire receiving box, which has a top opening for access. For removing a long broken metal wire, the mechanical arm needs a long stroke displacement and may be unable to put the long broken metal wire into the wire receiving box accurately. Providing a big-sized wire receiving box having a big opening can receive long broken metal wires. However, installing a big-sized wire receiving box in a WEDM relatively increases the cost of the WEDM, and is inconvenient in use.

SUMMARY OF THE INVENTION

The present invention has been accomplished under the circumstances in view. It is one objective of the present invention to provide a wire collecting mechanism for WEDM, which requires less installation space in the WEDM and greatly reduces the cost of the WEDM.

It is another objective of the present invention to provide a wire collecting mechanism for WEDM, which is convenient in use.

To achieve these objectives of the present invention, the wire collecting mechanism provided by the present invention is used for cutting and collecting a metal wire used in a wire-cut electrical discharge machine. The wire collecting mechanism includes a first guide roller and a second guide roller movable relative to the first guide roller for clamping the metal wire that passes between the first guide roller and the second guide roller. A wire cutter is moveable relative to the metal wire for cutting the metal wire that is clamped by the first and second guide rollers into a piece. A wire collecting box is provided with a mouth facing the metal wire and a suction force in a direction from the mouth towards an inside of the wire collecting box. A press roller is movable relative to the metal wire for pressing and forcing a cutting piece of the metal wire into the mouth of the wire collecting box, such that the cutting piece of the metal wire can be sucked into the wire collecting box for collection.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 2:
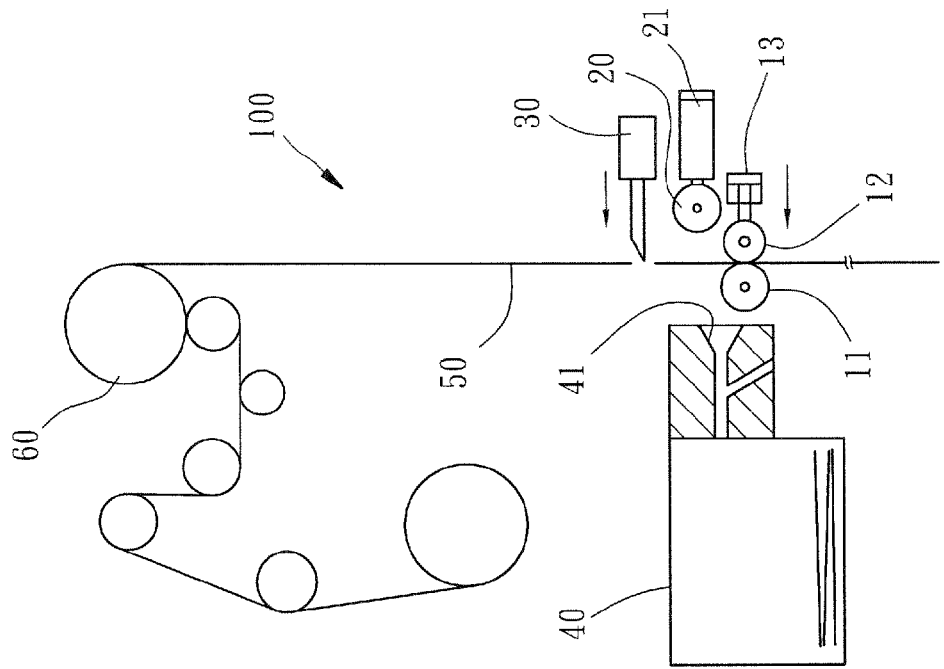
FIG. 2 is similar to FIG. 1, but showing that the metal wire is cut by a wire cutter.

As shown in FIGS. 1-6, a wire collecting mechanism 100 used in a wire-cut electrical discharge machine (WEDM) in accordance with a preferred embodiment of the present invention comprises mainly a wire guiding roller set 10, a press roller 20, a wire cutter 30 and a wire collecting box 40.

The wire guiding roller set 10 includes a first guide roller 11 and a second guide roller 12. The first guide roller 11 is rotatably mounted to a base of a WEDM (not shown) and rotatable on its own axis. The second guide roller 12 is connected to the base of the WEDM through a first air cylinder 13 and reciprocally movable by the first air cylinder 13 between a wire-clamping position and a wire-releasing position. When in the wire-releasing position, the second guide roller 12 is spaced from the first guide roller 11 by a gap, which provides a path for the passing of a metal wire 50. When in the wire-clamping position, the second guide roller 12 is closely attached to the first guide roller 11 to clamp the metal wire 50 in between the first guide roller 11 and the second guide roller 12.

The press roller 20 is connected to the base of the WEDM through a second air cylinder 21, and reciprocally movable by the second air cylinder 21 between a press position and a release position. When in the press position, the press roller 20 enters the path of the metal wire 50, so that the metal wire 50 is pressed by the press roller 20. When in the release position, the press roller 20 is offset from the path of the metal wire 50.

The wire cutter 30 is installed in the base of the WEDM, and reciprocally movable between a cutting position and a non-cutting position. When in the cutting position, the wire cutter 30 enters the path of the metal wire 50, so that the metal wire 50 is cut off by the wire cutter 30. When in the non-cutting position, the wire cutter 30 is offset from the path of the metal wire 50. Further, the wire cutter 50, the press roller 20 and the second guide roller 12 are disposed at a same side relative to the metal wire 50 and arranged at different elevations in a proper order along the moving direction of the metal wire 50.

The wire collecting box 40 is a box controllable to provide a suction force and mounted in the base of the WEDM and spaced from the metal wire 50 at the other side opposite to the press roller 20. The wire collecting box 40 has a mouth 41 facing the metal wire 50. The mouth 41 has a tapered opening gradually reducing in diameter from the outside of the wire collecting box 40 toward its inside.

After understanding of the configurations and arrangement of the component parts of the wire collecting mechanism 100, the operation and features of the wire collecting mechanism 100 are outlined hereinafter.

Figure 1:
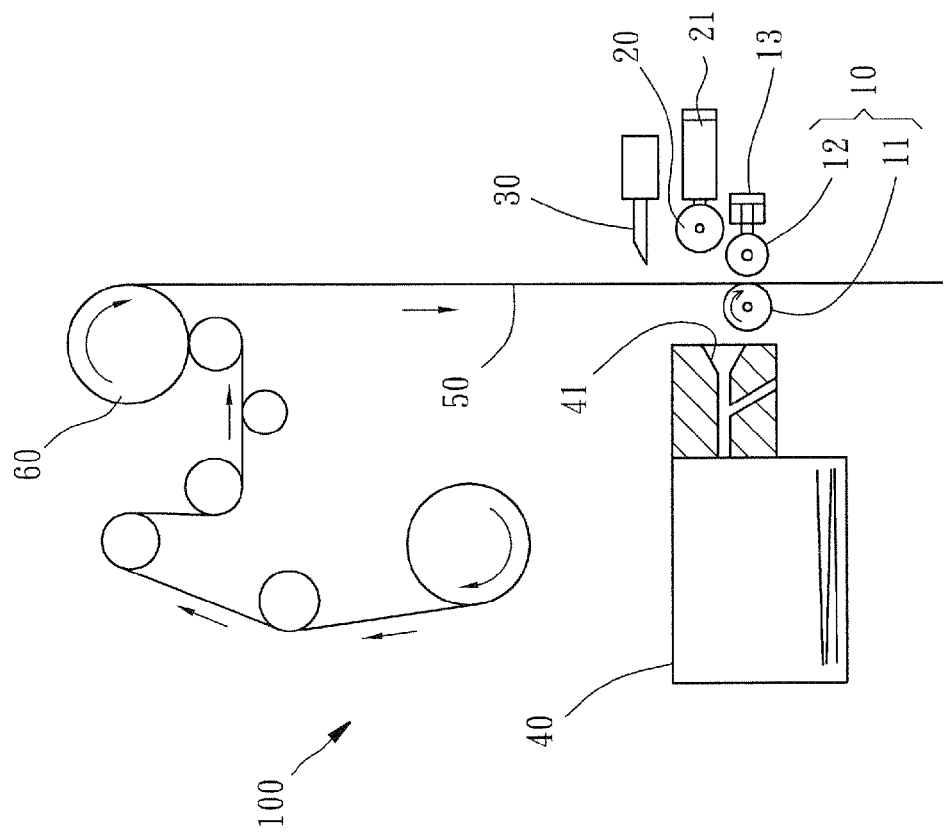
FIG. 1 is a schematic drawing showing a wire collecting mechanism for a WEDM according to a preferred embodiment of the present invention.

At first, as shown in FIG. 1, when the metal wire 50 is guided by spools 60 to move from the start point to the end point continuously and the metal wire 50 has a part continuously moving through the gap between the first guide roller 11 and the second guide roller 12, the second guide roller 12 is in the wire-releasing position, the press roller 20 is in the release position, and the wire cutter 30 is in the non-cutting position. At this time, the second guide roller 12, the press roller 20 and the wire cutter 30 do not interfere with the movement of the metal wire 50, and the first guide roller 11 is rotating in a first direction (the clockwise direction) to guide movement of the metal wire 50 to perform a cutting operation.

Referring to FIG. 2, if the metal wire 50 is broken during a cutting operation, the broken status of the metal wire 50 will be detected by a control system. Upon detection of the broken status of the metal wire 50, the control system immediately controls the spools 60 to rotate in a second direction (i.e., the counter-clockwise direction) and the first air cylinder 13 to move the second guide roller 12 to the wire-clamping position to hold down the metal wire 50, and then controls movement of the wire cutter 30 to the cutting position to cut the metal wire 50 off in such a manner that the cutting tip can be in a sharp condition. The wire cutter 30 cuts the metal wire 50 by high frequency electric cutting.

Figure 3:
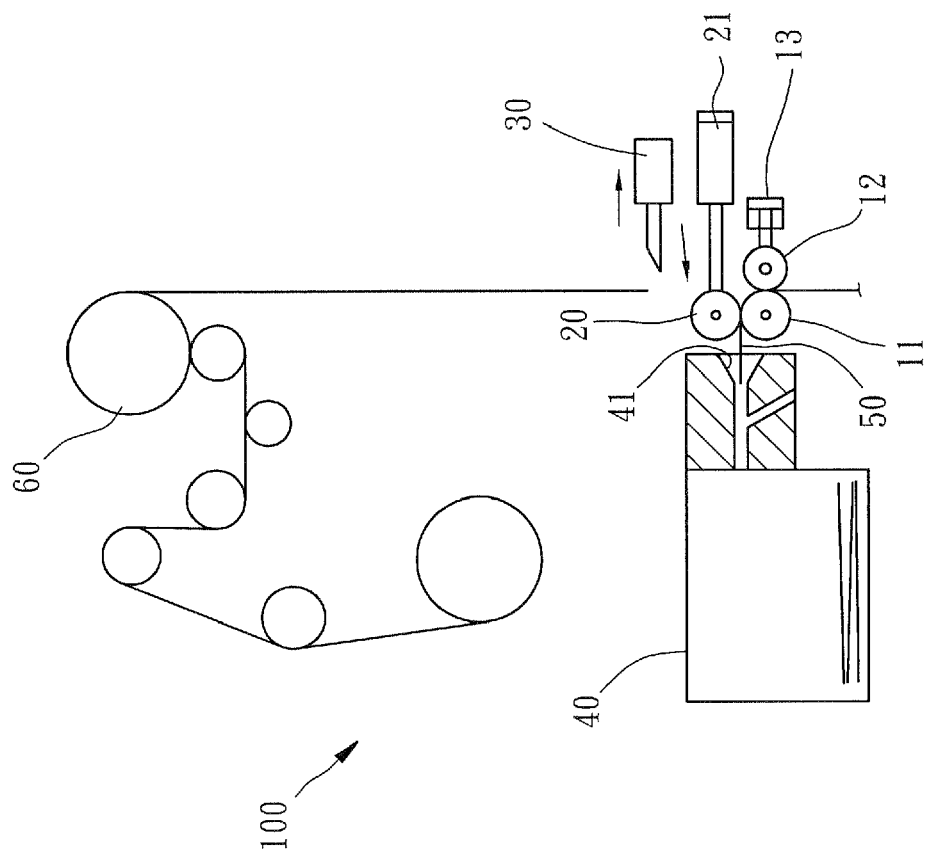
FIG. 3 is similar to FIG. 2, but showing that the cutting piece of the metal wire is pressed and bent by a press roller.

Referring to FIG. 3, after cutting of the metal wire 50 by the wire cutter 30, the control system controls the second air cylinder 21 to move the press roller 20 to the press position and simultaneously controls movement of the wire cutter 30 to the non-cutting position, for enabling the suspending end of the cutting piece of metal wire that is clamped by the first guide roller 11 and the second guide roller 12 to be forced into the mouth 41 of the wire collecting box 40 by the press roller 20.

Figure 4:
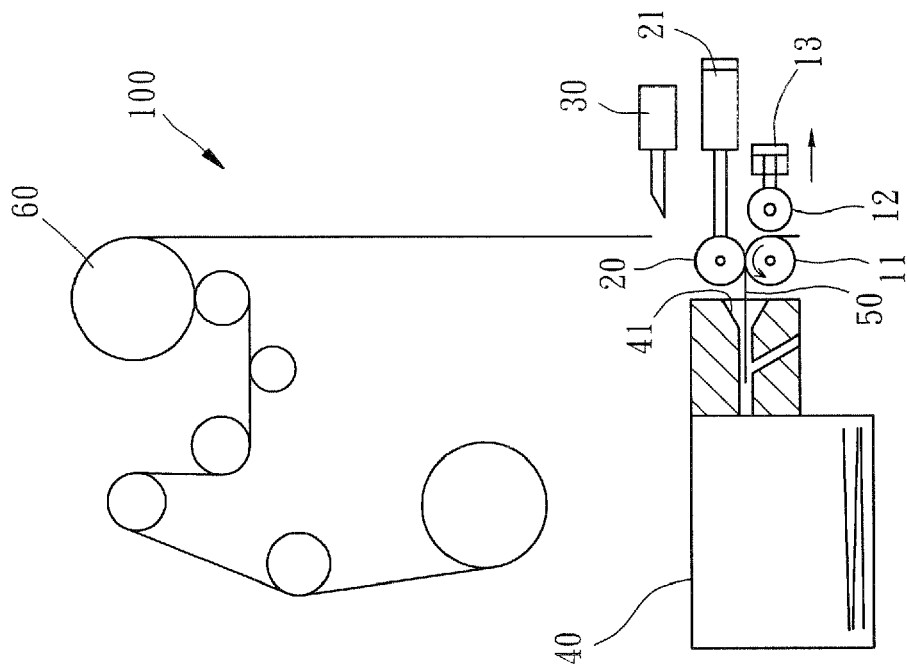
FIG. 4 is similar to FIG. 3, but showing that the cutting piece of the metal wire is sent to a mouth of a wire collecting box.

Referring to FIG. 4, when the end of the cutting piece of metal wire is forced into the mouth 41 of the wire collecting box 40, the wire collecting box 40 is controlled to produce a suction force to suck in the cutting piece of metal wire, and at the same time the first air cylinder 13 is controlled to move the second guide roller 12 to the wire-releasing position to release the broken metal wire 50 that has be cut into a piece.

Figure 5:
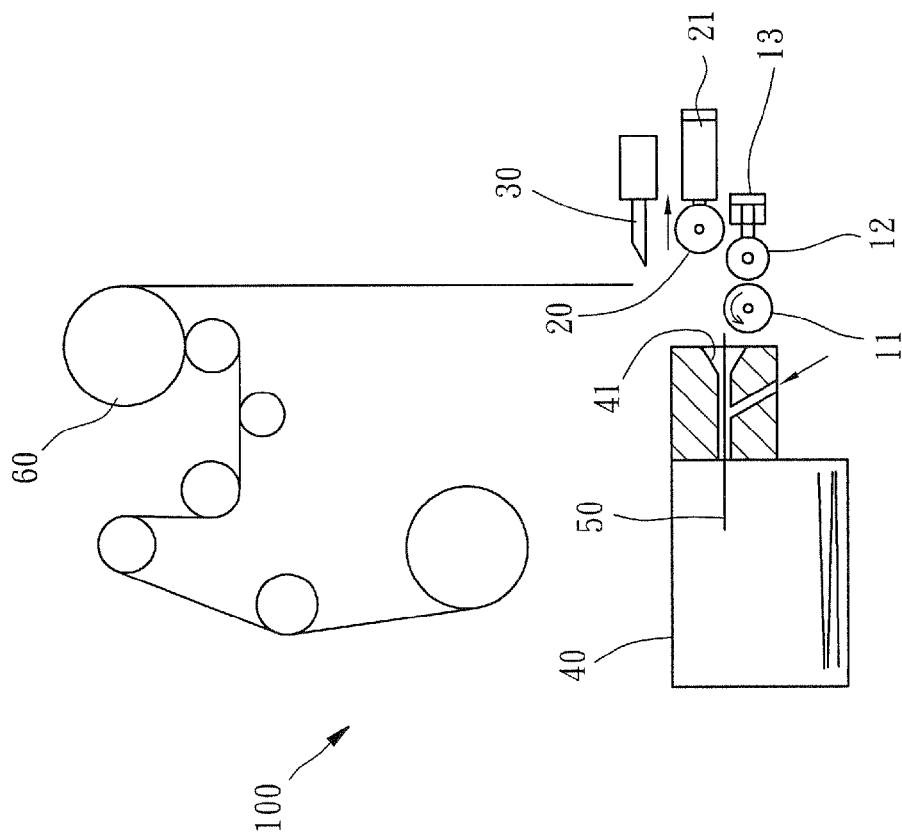
FIG. 5 is similar to FIG. 4, but showing that the cutting piece of the metal wire is sent to the wire collecting box by a suction force.

Referring to FIG. 5, after the first air cylinder 13 moved the second guide roller 12 to the wire-releasing position, the second air cylinder 21 is controlled to move the press roller 20 to the release position, allowing the cutting piece of metal wire to be fully sucked into the inside of the wire collecting box 40.

Figure 6:
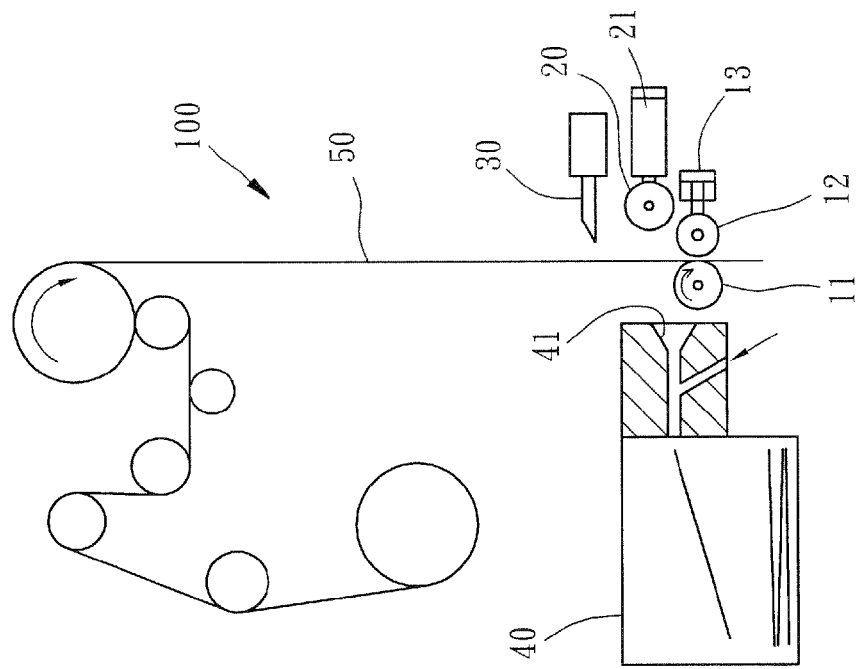
FIG. 6 is similar to FIG. 5, but showing that the cutting piece of the metal wire is completely sent to the inside of the wire collecting box.

Referring to FIG. 6, after the cutting piece of metal wire has been fully received in the wire collecting box 40, the spools 60 are controlled to rotate in the first direction (clockwise direction) to force the sharp end of the metal wire 50 at the start point into the gap between the first guide roller 11 and the second guide roller 12 for performing a cutting action on the workpiece.

Therefore, by means of the application of a suction force to suck the broken metal wire that has been cut into a piece into the wire collecting box instead of using a mechanical arm, the invention greatly reduces the manufacturing cost of the WEDM. Further, receiving the broken metal wire by means of the application of a suction force allows the size of the receiving box to be greatly reduced, favoring the fabrication and application of the WEDM.

The invention being thus described it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wire collecting mechanism for a wire-cut electrical discharge machine, the wire collecting mechanism comprising:
    a wire guiding roller set including a first guide roller and a second guide roller movable relative to the first guide roller to a position where the second guide roller is attached to the first guide roller to clamp a metal wire that passes between the first guide roller and the second guide roller;
    a wire cutter moveable relative to the metal wire for cutting the metal wire at a cut end upstream of the wire guiding roller set, when the metal wire is clamped by the first and second guide rollers;
    a wire collecting box having a mouth facing the metal wire and provided with a suction force from the mouth towards an inside of the wire collecting box; and
    a press roller movable relative to the metal wire and operable to guide and move the cut end of the metal wire in a direction toward the mouth of the wire collecting box, wherein in conjunction with the first guide roller, the press roller is operable to force a cut piece of the metal wire into the mouth of the wire collecting box.

2. The wire collecting mechanism as claimed in claim 1, further comprising a first air cylinder connected with the second guide roller for moving the second guide roller.

3. The wire collecting mechanism as claimed in claim 1, further comprising a second air cylinder connected with the press roller for moving the press roller.

4. The wire collecting mechanism as claimed in claim 1, wherein the second guide roller, the press roller and the wire cutter are disposed at a same side relative to the metal wire.

5. The wire collecting mechanism as claimed in claim 1, wherein the mouth of the wire collecting box has a tapered shape gradually reducing in diameter from an outside of the wire collecting box toward the inside of the wire collecting box.

\* \* \* \* \*